(12) United States Patent
Muthusamy et al.

(10) Patent No.: US 9,012,574 B2
(45) Date of Patent: *Apr. 21, 2015

(54) GRAFT COPOLYMER WITH PH DEPENDENT BEHAVIOUR

(75) Inventors: Ramesh Muthusamy, Pune (IN); Mohan Gopalkrishna Kulkarni, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 210 days.

This patent is subject to a terminal disclaimer.

(21) Appl. No.: 13/582,828

(22) PCT Filed: Mar. 9, 2011

(86) PCT No.: PCT/IN2011/000160
§ 371 (c)(1),
(2), (4) Date: Nov. 16, 2012

(87) PCT Pub. No.: WO2011/111071
PCT Pub. Date: Sep. 15, 2011

(65) Prior Publication Data
US 2013/0059986 A1 Mar. 7, 2013

(30) Foreign Application Priority Data

Mar. 9, 2010 (IN) .............. 0533/DEL/2010

(51) Int. Cl.
*C08G 63/91* (2006.01)
*C08F 283/01* (2006.01)

(52) U.S. Cl.
CPC .................. *C08F 283/01* (2013.01)

(58) Field of Classification Search
CPC .............................. C08F 283/00; C08F 226/06
See application file for complete search history.

(56) References Cited

U.S. PATENT DOCUMENTS

| | | | |
|---|---|---|---|
| 6,998,456 B1 | 2/2006 | Mallapragada et al. |
| 2005/0281874 A1 | 12/2005 | Menjoge et al. |
| 2006/0141053 A1 | 6/2006 | Menjoge et al. |
| 2007/0072996 A1 | 3/2007 | Kedar et al. |
| 2007/0073014 A1 | 3/2007 | Kedar et al. |

*Primary Examiner* — Suzanne Ziska
*Assistant Examiner* — Thurman Wheeler
(74) *Attorney, Agent, or Firm* — Locke Lord LLP; Barry Kramer; Nicholas J. DiCeglie, Jr.

(57) ABSTRACT

A graft copolymer with pH dependent behavior of formula 1 Comprises, (i) a backbone having the formula 1 $[A_{(x)}B_{(y)}C_{(z)}]$ wherein (A) is diol, (B) is dicarboxylic acid or acid anhydride and (C) is monomer containing pendent unsaturation such that (x)=41-45%, (y)=49-53% (z)=4-7% by mole; and (ii) a graft which is a polymer of the basic monomer (D) which comprises "w" weight percent of the total weight of said graft copolymer such that 'w' is 22-52%. The graft copolymers do not swell/dissolve at neutral and basic pH and swell/dissolve at acidic pH. The polymers are useful as protective coating for pharmaceutical dosage forms and as excipient in the development of extended release drug delivery systems.

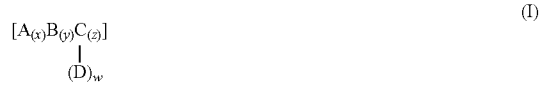

(I)

7 Claims, No Drawings

GRAFT COPOLYMER WITH PH DEPENDENT BEHAVIOUR

CROSS REFERENCE TO RELATED APPLICATIONS

This application is a U.S. National Stage application under 35 U.S.C. §371 of International Patent Application Serial No. PCT/IN2011/000160, filed Mar. 9, 2011, which Application claims the benefit of priority of the Indian Patent Application Number 0533/DEL/2010, filed Mar. 9, 2010, the disclosures of each of which are expressly incorporated by reference in their entireties.

FIELD OF THE INVENTION

The present invention relates to the graft copolymer exhibiting pH dependent behavior of formula 1

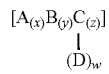

Formula 1

Present invention also relates to the pH dependent graft copolymer for the protection of pharmaceutically active agents from the near neutral and basic pH medium and releases them at acidic pH prevalent in the stomach.

BACKGROUND OF THE INVENTION

Polymers which undergo reversible phase transformation are most widely used for the development of pharmaceutical formulations. Especially polymers with pH dependent dissolution behavior are getting much attention. These polymers are capable of suppressing the drug release at one pH and releasing the same at another pH.

The copolymer of 2-dimethylaminoethyl methacrylate, butylmethacrylate and methyl methacrylate is readily soluble in gastric fluid wherein the pH is <5.0. However, this polymer is permeable to the aqueous medium of pH>5.0 which limits its application as a moisture protective coating for pharmaceutical dosage forms. Particularly, in the development of oral suspensions wherein the drug encapsulated polymer particles are being suspended in reconstituted medium at pH~5.5. If the polymer is permeable to this medium, the encapsulated drug can leach out and may lead to bitter taste for the formulation. Such polymers are also found to be useful as a rumen protective coating for drug and other feed supplements of the ruminants. Such coated compositions are capable of protecting the active agents from degradation by microorganism present in the rumen and releasing the content in the digestive system. Also the rapid dissolution of the polymer at acidic pH, limits its utility in the development of extended release formulations.

Reference may be made to patent "EP 1334986 A2" wherein Rodrigues et al. disclosed a graft copolymer which comprised either a hydrophobic backbone and amine graft chains or vice versa. The said graft copolymers are insoluble at the pH of >8.0 and they dissolved when the pH was reduced to <8.0. Since these polymers are readily dissolved at the pH of <8.0, they can not be used either as a moisture protective coating or as an excipient for the extended release formulation.

Reference may be made to Journal "Christopher D. Batich, Jun Yan, Charles Bucaria Jr. and Maher Elsabeer, Macromolecules, 26, 4675, 1993" wherein a crosslinked pH sensitive copolymer comprised styrene, 2 or 4-vinylpyridine and divinylbenzene is disclosed. The polymer was prepared in the form of beads by suspension polymerization. The pH dependent swelling behavior of the polymer was studied to explore its application in the field of drug delivery. The swelling of the polymer was not significant at pH>5 and the extent of swelling at pH<5 depended on the 2 or 4-vinylpyridine and divinylbenzene content of the polymer.

References may be made to Journals "Polymer, 43, 1533, 2002; Kim et al in Polymer Journal, 37, 565, 2005; Brahim et al in Biomacromolecules, 4, 497, 2003; Yanfeng et al in Radiation Physics and Chemistry, 61, 65, 2001 and Traitel et al in Biomaterials, 21, 1679, 2000" wherein crosslinked pH sensitive polymers are disclosed. Ratering et al. described a resin composition as a cocatalyst for the oxidative coupling of 2-mercaptoethanol [Quaternised poly(4-vinylpyridine) anchored on a macroporous poly(trimethylolpropane trimethacrylate-methylmethacrylate) resin, as cocatalyst in the cobaltphthalocyanine catalysed oxidative coupling of 2-mercaptoethanol by M. T. Ratering, et al in Reactive Polymers, 19, 233, 1993]. The resin was prepared by crosslinking copolymerization of methyl methacrylate and trimethylolpropane trimethacrylate. 4-vinypyridine monomer was grafted on the resin by reacting with unreacted residual unsaturations of trimethylolpropane trimethacrylate. The 4-vinyl pyridine graft chains of the resin were quaternised and used as catalyst. Similarly, a highly crosslinked copolymer comprising an amino monomer and a crosslinker was reported by Kempe et al. in U.S. Pat. No. 5,656,707. It has been claimed that the developed polymer is useful as a support in solid phase organic synthesis.

It is evident from the above disclosures that the currently available pH sensitive polymers swell or dissolve to some extent at the neutral and basic pH. Hence the coating of such polymers on the drug delivery formulations leads to penetration of the moisture. This is not desirable especially for the drugs which undergo transformation to their inactive form due to the presence of moisture on storage. Hence, these polymers can not be effective as a moisture protective coating. Similarly, in the case of oral suspension, the penetration of moisture into the polymer coated drug particles may lead to leaching of drug in the reconstitution medium. This gives unfavorable taste for the formulations which reduces the patient compliance. Also, these polymers are rapidly dissolved in the acidic pH medium prevalent in the stomach. Such rapid dissolution behavior limits their utility in the development extended release formulations especially gastroretentive dosage forms.

Moreover, the above disclosures also show the availability of numerous pH dependent crosslinked polymers. However, these polymers swell in both acidic and basic pH medium. Only the extent of swelling is different with respect to pH. These polymers are chemically crosslinked and hence they are not soluble in solvents. As a result the reported hydrogels have limited processability. Especially they can not be processed to obtain a film coating over the drug delivery formulations.

Also the drug loading into the hydrogel is a critical process. It is loaded either by adding the drug in the reaction mixture of hydrogel or by soaking the synthesized hydrogel in the drug solution. When the drug is loaded during the hydrogel preparation, the removal of unreacted components is critical as it leads to leaching of loaded drug. On the other hand, the loading of drug by imbibition method is time consuming and achievable, loading is very low. Such lower drug loadings are not desirable as the amount of polymer needed would be very large, possibly not meeting regulatory requirements. This limits the utility of hydrogels in the development of extended release formulations. Thus there is a need identified from the art for pH dependent polymer which is impermeable to neutral pH medium and swells/dissolves at the acidic pH prevalent in the stomach.

Further, there is also a need for polymer which is impermeable to the near neutral pH conditions and dissolves to release the content under the acidic pH conditions, which is useful for the development of oral liquid suspension comprising a bitter drug.

Such polymer will find use amongst other applications, as a protective coating material for pharmaceutical dosage form and as an excipient in the development of extended release formulations. The present invention discloses such a graft copolymer.

OBJECTIVE OF THE INVENTION

The main objective of the present invention is to provide a graft copolymer exhibiting pH dependent behavior. Another objective of the present invention is to provide a graft copolymer for the protection of pharmaceutically active agents from the near neutral and basic pH medium and releases them at acidic pH prevalent in the stomach.

SUMMARY OF THE INVENTION

The present invention provides a graft copolymer exhibiting pH dependent behavior, having a formula 1

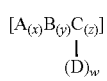

Formula 1 comprises:
(i) a backbone having the formula -$[A_{(x)}B_{(y)}C_{(z)}]$ comprising:
a diol (A), a dicarboxylic acid or acid anhydride (B) and a monomer containing pendent unsaturation (C) wherein (x)=41-45%, (y)=49-53% (z)=4-7% by mole; and
(ii) a graft which is a polymer of the basic monomer (D) and 'w' is a weight percent of the total weight of said graft copolymer such that 'w' is 22-52%.

In an embodiment of the present invention, backbone is polyester.

In another embodiment of the present invention, the diol is selected from the group consisting of aliphatic diol, cycloaliphatic diol and aromatic diol.

In yet another embodiment of the present invention, the aliphatic diol is selected from the group consisting of 1,2-ethane diol, 1,3-propane diol, 1,2-propane diol, 2-methyl-1,3-propane diol, 1,4-butane diol, 1,3-butane diol, 1,2-butane diol, 1,5-pentane diol, 1,6-hexane diol, 1,7-heptane diol, 1,8-octane diol, 1,9-nonane diol, and 1,12-dodecane diol.

In yet another embodiment of the present invention, the cycloaliphatic diol is 1,4-cyclohexanedimethanol.

In still another embodiment of the present invention, aromatic diol is bis(2-hydroxyethyl)terephthalate.

In yet another embodiment of the present invention, the dicarboxylic acid is selected from the group consisting of succinic acid, glutaric acid, adipic acid, pimelic acid, suberic acid, azelaic acid, sebacic acid and dodecanedioic acid.

In still another embodiment of the present invention, the acid anhydride is selected form succinic anhydride and phthalic anhydride.

In yet another embodiment of the present invention, the monomer containing pendent unsaturation is an epoxy monomer or a diol monomer.

In yet another embodiment of the present invention, the epoxy monomer is selected from glycidyl methacrylate and glycidyl acrylate.

In yet another embodiment of the present invention, the diol monomer is selected from trimethylolpropane monomethacrylate and trimethylolpropane monoacrylate.

In yet another embodiment of the present invention, the basic monomer is a tertiary amine.

In yet another embodiment of the present invention, the tertiary amine is a heterocyclic compound.

In yet another embodiment of the present invention, the heterocyclic compound is selected from the group consisting of 2-vinyl pyridine, 3-vinyl pyridine and 4-vinyl pyridine more preferably 4-vinyl pyridine.

In yet another embodiment of the present invention, process for preparation of graft copolymer comprising the steps of
i. stirring monomer (C), titanium (IV) butoxide and hydroquinone in two neck round bottom flask for 10 to 15 minute;
ii. adding diol (A), dicarboxylic acid or acid anhydride (B) and raising the temperature to 160° C. to 170° C. over 45 minutes and unstained for 5-7 hours followed by applying vacuum of 170 mm of Hg for 3-5 hours to obtain unsaturated polyester;
iii. dissolving unsaturated polyester as obtained in step (ii) in chloroform and precipitating in cold methanol;
iv. filtering, washing with methanol and drying for 20-25 hours to obtain said unsaturated polyester in dried form;
v. dissolving dried unsaturated polyester as obtained in step (iv), basic monomer and azobis isobutyronitrile in dimethyl formamide followed by purging with nitrogen and grafting the monomer on the unsaturated polyester at 60-70° C. for 18-22 hours;
vi. concentrating, precipitating and drying to obtain graft copolymer.

In still another embodiment of the present invention, the pH dependent graft copolymer is soluble in organic solvents selected from the group consisting of dimethylformamide, dimethylacetamide, tetrahydrofuran, chloroform and 1,2-dichloromethane.

In still another embodiment of the present invention, the pH dependent graft copolymer swells or dissolves at pH≤3.0.

In yet another embodiment of the present invention, wherein the pH dependent graft copolymer swells and dissolves at pH≤3.0.

DETAILED DESCRIPTION OF THE INVENTION

The present invention provides a pH dependent graft copolymer having the formula 1

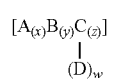

Formula 1 comprises:
(i) a backbone having the formula 1$[A_{(x)}B_{(y)}C_{(z)}]$ comprising (A) a diol, (B) a dicarboxylic acid or acid anhydride and (C) a monomer containing pendent unsaturation wherein (x)=41-45%, (y)=49-53% (z)=4-7% by mole; and (ii) a graft which is a polymer of the basic monomer (D) which comprises 'w' weight percent of the total weight of the said pH sensitive graft copolymer such that 'w' is 22-50%. The backbone is polyester.

The diol (A) is selected from the group comprising aliphatic diol, cycloaliphatic diol and aromatic diol. The aliphatic diol is selected from 1,2-ethane diol, 1,3-propane diol, 1,2-propane diol, 2-methyl-1,3-propane diol, 1,4-butane diol, 1,3-butane diol, 1,2-butane diol, 1,5-pentane diol, 1,6-hexane diol, 1,7-heptane diol, 1,8-octane diol, 1,9-nonane diol and 1,12-dodecane diol. The cycloaliphatic diol is 1,4-cyclohexanedimethanol. The aromatic diol is bis(2-hydroxyethyl) terephthalate.

The dicarboxylic acid or acid anhydride (B) is selected from the group consisting of succinic acid, glutaric acid, adipic acid, pimelic acid, suberic acid, azelaic acid, sebacic acid, dodecanedioic acid, succinic anhydride and phthalic anhydride.

The monomer containing pendent unsaturation (C) is selected from the group consisting of glycidyl methacrylate, glycidyl acrylate, trimethylolpropane monomethacrylate and trimethylolpropane monoacrylate.

The basic monomer (D) is selected from 2-vinylpyridine, 3-vinylpyridine and 4-vinylpyridine.

Another aspect of the present invention is preparation of pH dependent graft copolymer or formula 1, which involves two steps. In the first step, the unsaturated polyester backbone was synthesized by melt polycondensation of a diol (A), a dicarboxylic acid or acid anhydride (B) and a monomer having pendant unsaturation (C) to yield unsaturated polyester having the formula $[A_{(x)}B_{(y)}C_{(z)}]$. The reaction was carried out in the presence, of Titanium (IV) butoxide and hydroquinone.

In the second step, the unsaturated polyester was grafted with basic monomer in various weight ratios by free radical copolymerization. The reaction was carried out in organic solvent in the presence of azobisisobutyronitrile. The graft copolymers thus obtained do not contain free unsaturations, as all are utilized during the grafting reaction. The synthesized graft copolymers are soluble in organic solvents such as dimethylformamide, dimethylacetamide, tetrahydrofuran, chloroform and 1,2-dichloromethane.

In one aspect of the invention, the pH dependent graft copolymer, of the invention of formula 1 is prepared by the process comprising:
i. stirring monomer (C), titanium (IV) butoxide and hydroquinone in two neck round bottom flask for 15 minutes;
ii. adding diol (A), dicarboxylic acid or acid anhydride (B) and raising the temperature to 170° C. over 45 minutes, and maintained for 6 hours followed by applying vacuum of 170 mm Hg at the end of 6 hours and farther continuing the reaction for another 4 hours to obtain unsaturated polyester;
iii. dissolving the unsaturated polyester as obtained in step (ii) in chloroform and precipitating in cold methanol;
iv. filtering, washing with methanol and drying for 24 hours to obtain unsaturated polyester in dried form;
v. dissolving the dried unsaturated polyester as obtained in step (iv), basic monomer and azobisisobutyronitrile in dimethyl formamide followed by purging with nitrogen and polymerizing at 65° C. for 20 hours;
vi. concentrating, precipitating and drying to obtain graft copolymer.

In another aspect, the degree of swelling of the graft copolymers was determined using the graft copolymer of the present invention in the film form. The polymer films were prepared by solution casting method. Thickness and diameter of the films were 200 μm and 2 cm respectively. The films were placed in 0.1 N HCl and pH 5.8 phosphate buffer solutions separately. At regular intervals the films were removed and blotted with tissue paper to remove excess water in the surface and weighed. The degree of swelling (DS) of the films was calculated using the equation, $$DS=[(W_s-W_d)/W_d]\times 100$$

wherein, $W_s$ and $W_d$ are the swollen and dry weight of the polymer respectively.

The graft copolymers of the instant invention were studied for their pH dependent behavior as described herein. As seen in examples 1 to 11, the graft copolymers displayed swelling to disintegration/dissolution with respect to time. The decrease in degree of swelling with respect to time indicates the disintegration/dissolution of polymer. The polymer disintegrates/dissolves completely when the degree of swelling approaches −100%.

In the examples the diol, dibasic acid, unsaturated monomer and basic monomer are described by the following abbreviations.

1,2 ED—1,2 Ethane diol, 1,4 BD—1,4 Butane diol, 1,6 HD—1,6 Hexane diol, 1,12 DD—1,12 Dodecane diol, 1,4 CD—1,4 Cyclohexane dimethanol, BHET—bis(2-hydroxyethyl) terephthalate, FA—Fumaric acid, IA—Itaconic acid, SA—Succinic acid, SEB—Sebacic acid, AA—Adipic acid, DDA—Dodecanedioic acid, PA—Phthalic anhydride, AGE—Allyl glycidyl ether, TMPAE—Trimethylolpropane monoallyl ether GMA—Glycidyl methacrylate, TMPMA—Trimethylolpropane monomethacrylate, 4VP—4-Vinylpyridine.

The following examples are given by way of illustration only and therefore should not be construed to limit the scope of the present invention.

Comparative Example 1

This example discloses the preparation of

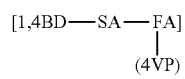

graft copolymer.

This involves, the preparation of (a) unsaturated polyester [1,4 BD-SA-FA] and (b) graft copolymerization of 4VP on said unsaturated polyester.

A. Preparation of Unsaturated Polyester

The unsaturated polyester was prepared by melt polycondensation of 1,4 BD, SA and FA using Titanium (IV) butoxide and hydroquinone. The reaction was carried out in a two neck round-bottom flask equipped with a nitrogen containing bladder and a water cooled condenser. The flask was charged with 10.900 g (0.1209 moles) of 1,4 BD, 11.712 g (0.0991 moles) of SA, 2.527 g (0.0217 moles) of FA, 0.025 g ($7.3481\times10^{-05}$ moles) of Titanium (IV) butoxide and 0.200 g ($1.8163\times10^{-03}$ moles) of hydroquinone. The reaction was started by raising the temperature to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and FA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 49:43:8 (1,4 BD:SA:FA) and 8486 g mol$^{-1}$ respectively.

B. Preparation of Graft Copolymer

The graft copolymer was prepared by solution polymerization. The unsaturated polyester [1,4 BD-SA-FA], 4VP and 1% wt/wt of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers was 23, 29 and 35 wt. %. The $^1$H NMR spectrum of the graft copolymer shows the unsaturations were not completely utilized during the grafting reaction. On storage the free unsaturations were polymerized and resulted in crosslinked polymer network. The crosslinked polymers did not dissolve in common organic solvents and their mixtures. Hence this polymer can not be processed to obtain various kinds of drug delivery formulations.

Comparative Example: 2

This example discloses the preparation of

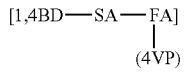

graft copolymer.

This involves, the preparation of (a) unsaturated polyester [1,4 BD-SA-IA] and (b) graft copolymerization on said unsaturated polyester with 4VP.

A. Preparation of Unsaturated Polyester

The unsaturated polyester was prepared by melt polycondensation of 1,4 BD, SA and IA using Titanium (IV) butoxide and hydroquinone. The reaction was carried out in a two neck round-bottom flask equipped with a nitrogen containing bladder and a water cooled condenser. The flask was charged with 8.660 g (0.0960 moles) of 1,4 BD, 9.078 g (0.0768 moles) of SA, 2.500 g (0.0192 moles) of IA, 0.020 g (5.8785×10$^{-05}$ moles) of Titanium (IV) butoxide and 0.100 g (9.0818×10$^{-04}$ moles) of hydroquinone. The reaction was started by raising the temperature to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and IA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 49:45:6 (1,4 BD:SA:IA) and 5500 g mol$^{-1}$ respectively.

B. Preparation of Graft Copolymer

The graft copolymer was prepared by solution polymerization. The unsaturated polyester-[1,4 BD-SA-IA], 4VP and 1% wt/wt. of free radical initiator azobisisobutyronitrile were dissolved in dimethylformamide. After purging with nitrogen, polymerization was carried out at 65° C. for 20 hours. The polymer solution, was concentrated by using rota-evaporator. The polymer was precipitated into cold methanol/water mixture (1:1 v/v) and dried at room-temperature under vacuum. The said graft copolymer was prepared as to incorporate three different levels of 4VP by varying the weight ratio of the unsaturated polyester to 4VP in the feed. The 4VP content of the graft copolymers was 20, 28 and 36 wt. %. The $^1$H NMR spectrum of the graft copolymer shows the unsaturations were not completely utilized during the grafting reaction. On storage the free unsaturations were polymerized and resulted in crosslinked polymer network. The crosslinked polymers did not dissolve in common organic solvents and their mixtures. Hence this polymer can not be processed to obtain various kinds of drug delivery formulations.

Comparative Example: 3

This example discloses the preparation of—

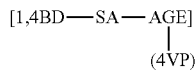

graft copolymer.

This involves, the preparation of (a) unsaturated polyester [1,4 BD-SA-AGE] and (b) graft copolymerization on said unsaturated polyester with 4VP.

A. Preparation of Unsaturated Polyester

The unsaturated polyester was prepared by melt polycondensation of 1,4 BD, SA and AGE using Titanium (IV) butoxide and hydroquinone. The reaction was carried out in a two neck round-bottom flask equipped with a nitrogen containing bladder and a water cooled condenser. The flask was charged with 3.199 g (0.0280 moles) of AGE, 0.200 g (1.8163×10$^{-03}$ moles) of hydroquinone and 0.025 g (7.3481×10$^{-05}$ moles) of Titanium (IV) butoxide and then stirred for 15 minutes. To this 8.00 g (0.0887 moles) of 1,4 BD and 13.793 g (0.1168 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and AGE in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 40:51:9 (1,4 BD:SA:AGE) and 4100 g mol$^{-1}$ respectively.

B. Preparation of Graft Copolymer

The graft copolymer was prepared by solution polymerization. The unsaturated polyester [1,4 BD-SA-AGE], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water-mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers was 5, 6 and 7 wt. %. The $^1$H NMR spectrum of the graft copolymer shows the unsaturations were not completely utilized during the grafting reaction. On storage the free unsaturations were polymerized and resulted in crosslinked polymer network. The crosslinked polymers did not dissolve in common organic solvents and their mixtures. Hence this polymer can not be processed to obtain various kinds of drug delivery formulations.

Comparative Example 4

This example discloses the preparation of—

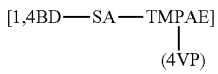

graft copolymer.

This involves, the preparation of (a) unsaturated polyester [1,4 BD-SA-TMPAE] and (b) graft copolymerization on said unsaturated polyester with 4VP.

A. Preparation of Unsaturated Polyester

The unsaturated polyester was prepared by melt polycondensation of 1,4 BD, SA and TMPAE using Titanium (IV) butoxide and hydroquinone. The reaction was carried out in a two neck round-bottom flask equipped with a nitrogen containing bladder and a water cooled condenser. The flask was charged with 7.023 g (0.0403 moles) of TMPAE, 0.400 g (3.6327×10$^{-03}$ moles) of hydroquinone and 0.050 g (1.4696× 10$^{-04}$ moles) of Titanium (IV) butoxide and then stirred for 15 minutes. To this 16.550 g (0.1836 moles) of 1,4 BD and 26.446 g (0.2239 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and TMPAE in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 41:51:8 (1,4 BD:SA:TMPAE) and 6708 g mol$^{-1}$ respectively.

B. Preparation of Graft Copolymer

The graft copolymer was prepared by solution polymerization. The unsaturated polyester [1,4 BD-SA-TMPAE], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers was 5, 6 and 6 wt. %. The $^1$H NMR spectrum of the graft copolymer shows the unsaturations were not completely utilized during the grafting reaction. On storage the free unsaturations were polymerized and resulted in crosslinked polymer network. The crosslinked polymers did not dissolve in common organic solvents and their mixtures. Hence this polymer can not be processed to obtain various kinds of drug delivery formulations.

Example 1

This example discloses the preparation of

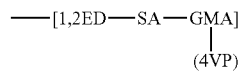

graft copolymer.

This involves, the preparation of (a) unsaturated polyester [1,2 ED-SA-GMA] and (Id) graft copolymerization on said unsaturated polyester with 4VP.

A. Preparation of Unsaturated Polyester

The unsaturated polyester was prepared by melt polycondensation of 1,2 ED, SA and GMA using Titanium (IV) butoxide and hydroquinone. The reaction was carried out in a two neck round-bottom flask equipped with a nitrogen containing bladder and a water cooled condenser. The flask was charged with 3.424 g (0.0240 moles) of GMA, 0.160 g (1.4530×10$^{-03}$ moles) of hydroquinone and 0.020 g (5.8768× 10$^{-05}$ moles) of Titanium (IV) butoxide and then stirred for 15 minutes. To this 4.735 g (0.0762 moles) of 1,2 ED and 11.851 g (0.1003 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,2 ED, SA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 42:53:5 (1,2 ED:SA:GMA) and 5851 g mol$^{-1}$ respectively.

B. Preparation of Graft Copolymer

The graft copolymer was prepared by solution polymerization. The unsaturated polyester [1,2 ED-SA-GMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 1 (A and B). The graft copolymers did not contain free unsaturations and they are stable on storage. The synthesized polymers are soluble in common organic solvents and their mixtures, so they can be processed to obtain various kinds of drug delivery formulations.

TABLE 1

The swelling degree of the graft copolymer

(A) Dissolution Medium: 0.1N HCl

| Time (hours) | 4-Vinylpyridine content (wt %) | | |
| --- | --- | --- | --- |
| | 22 | 28 | 39 |
| 0.5 | 201.76 | −4.94 | −17.84 |
| 1.0 | −14.97 | −36.81 | −63.56 |
| 2.0 | Disintegrated/Dissolved | Disintegrated/Dissolved | Disintegrated/Dissolved |

(B) Dissolution Medium: pH 5.8 phosphate buffer solution

| Days | 4-Vinylpyridine content (wt %) | | |
| --- | --- | --- | --- |
| | 22 | 28 | 39 |
| 1 | 3.02 | 3.50 | 3.77 |
| 4 | 4.03 | 4.59 | 2.37 |
| 7 | 2.80 | 3.93 | 2.92 |

Example 2

This example discloses the preparation of

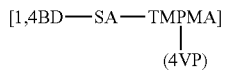

graft copolymer.

This involves, the preparation of (a) unsaturated polyester [1,4 BD-SA-TMPMA] and (b) graft copolymerization on said unsaturated polyester with 4VP.

A. Preparation of Unsaturated Polyester

The unsaturated polyester was prepared by melt polycondensation of 1,4 BD, SA and TMPMA using Titanium (IV) butoxide and hydroquinone. The reaction was carried out in a two neck round-bottom flask equipped with a nitrogen containing bladder and a water cooled condenser. The flask was charged with 3.163 g (0.0156 moles) of TMPMA, 0.150 g ($1.362 \times 10^{-03}$ moles) of hydroquinone and 0.025 g ($7.348 \times 10^{-05}$ moles) of Titanium (IV) butoxide and then stirred for 15 minutes. To this 8.660 g (0.0960 moles) of 1,4 BD and 13.195 g (0.1117 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and TMPMA in unsaturated polyester was determined by peak integral value of $^1$H NMR spectrum. The weight average molecular weight of unsaturated polyester was determined by Gel Permeation Chromatography using Styrage column and tetrahydrofuran as eluting solvent at the rate of 1 ml/min. Polystyrene was used as standard. The molar composition of the unsaturated polyester and its weight average molecular weight were 45:51:4 (1,4 BD SA:TMPMA) and 7081 g mol$^{-1}$ respectively.

B. Preparation of Graft Copolymer

The graft copolymer was prepared by solution polymerization. The unsaturated polyester [1,4 BD-SA TMPMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 2 (A and B). The graft copolymers did not contain free, unsaturations and they are stable on storage. The synthesized polymers are soluble in common organic solvents and their mixtures, so they can be processed to obtain various kinds of drug delivery formulations.

TABLE 2

The swelling degree of the graft copolymer

(A) Dissolution Medium: 0.1N HCl

| Time (hours) | 4-Vinylpyridine content (wt %) | | |
| --- | --- | --- | --- |
| | 33 | 40 | 52 |
| 0.5 | 261.83 | 203.20 | 10.71 |
| 1.0 | 84.35 | −57.43 | −63.98 |
| 2.0 | −9.16 | −65.88 | −72.32 |
| 3.0 | −18.32 | −73.17 | −86.01 |
| 5.0 | −28.62 | −80.17 | −90.17 |
| 7.0 | −39.69 | −85.71 | Disintegrated/Dissolved |
| 9.0 | −47.70 | −90.96 | — |
| 24.0 | −65.26 | Disintegrated/Dissolved | |

(B) Dissolution Medium: pH 5.8 phosphate buffer solution

| Days | 4-Vinylpyridine content (wt %) | | |
| --- | --- | --- | --- |
| | 33 | 40 | 52 |
| 1.0 | 4.13 | 3.12 | 3.09 |
| 4.0 | 4.01 | 2.77 | 2.86 |
| 7.0 | 3.48 | 1.21 | 2.39 |

Example 3

This example discloses the preparation of

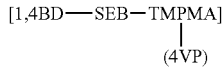

graft copolymer.

This involves, the preparation of (a) unsaturated polyester [1,4 BD-SEB-TMPMA] and (b) graft copolymerization on said unsaturated polyester with 4VP.

A. Preparation of Unsaturated Polyester

The unsaturated polyester was prepared by melt polycondensation of 1,4 BD, SEB and TMPMA using Titanium (IV) butoxide and hydroquinone. The reaction was carried out in a two neck round-bottom flask equipped with a nitrogen containing bladder and a water cooled condenser. The flask was charged with 2.607 g (0.0128 moles) of TMPMA, 0.150 g ($1.362 \times 10^{-03}$ moles) of hydroquinone and 0.025 g ($7.348 \times 10^{-05}$ moles) of Titanium (IV) butoxide and then stirred for 15 minutes. To this 6.100 g (0.0676 moles) of 1,4 BD and 16.297 g (0.0805 moles) of SEB were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SEB and TMPMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 45:50:5 (1,4 BD:SEB:TMPMA) and 9817 g mol$^{-1}$ respectively.

B. Preparation of Graft Copolymer

The graft copolymer was prepared by solution polymerization. The unsaturated polyester [1,4 BD-SEB-TMPMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 3 (A and B). The graft copolymers did not contain free unsaturations and they are stable on storage. The synthesized polymers are soluble in common organic solvents and their mixtures, so they can be processed to obtain various kinds of drug delivery formulations.

TABLE 3

The swelling degree of the graft copolymer (A) Dissolution Medium: 0.1N HCl

| Time (hours) | 4-Vinylpyridine content (wt %) | | |
|---|---|---|---|
| | 31 | 38 | 49 |
| 0.5 | 528.67 | 105.82 | 81.93 |
| 1.0 | 155.14 | −13.45 | −37.45 |
| 2.0 | 131.25 | −49.32 | −68.89 |
| 3.0 | 114.33 | −67.26 | −80.60 |
| 5.0 | 104.77 | −87.44 | Disintegrated/Dissolved |
| 7.0 | 92.27 | Disintegrated/Dissolved | — |
| 9.0 | 80.88 | — | — |
| 24.0 | 56.25 | — | — |

(B) Dissolution Medium: pH 5.8 phosphate buffer solution

| Day | 4-Vinylpyridine content (wt %) | | |
|---|---|---|---|
| | 31 | 38 | 49 |
| 1 | 2.45 | 2.33 | 2.63 |
| 4 | 2.11 | 1.88 | 3.66 |
| 7 | 1.31 | 3.53 | 3.83 |

Example 4

This example discloses the preparation of

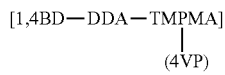

graft copolymer.

This involves, the preparation of (a) unsaturated polyester [1,4 BD-DDA-TMPMA] and (b) graft copolymerization on said unsaturated polyester with 4VP.

A. Preparation of Unsaturated Polyester

The unsaturated polyester was prepared by melt polycondensation of 1,4 BD, DDA and TMPMA using Titanium (IV) butoxide and hydroquinone. The reaction was carried out in a two neck round-bottom flask equipped with a nitrogen containing bladder and a water cooled condenser. The flask was charged with 2.674 g (0.0132 moles) of TMPMA, 0.150 g (1.362×10$^{-03}$ moles) of hydroquinone and 0.025 g (7.348× 10$^{-05}$ moles) of Titanium (IV) butoxide and then stirred for 15 minutes. To this 5.430 g (0.0602 moles) of 1,4 BD and 16.914 g (0.0734 moles) of DDA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, DDA and TMPMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 41:50:9 (1,4 BD:DDA:TMPMA) and 9776 g mol$^{-1}$ respectively.

B. Preparation of Graft Copolymer

The graft copolymer was prepared by solution polymerization. The unsaturated polyester [1,4 BD-DDA-TMPMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 4 (A and B). The graft copolymers did not contain free unsaturations and they are stable on storage. The synthesized polymers are soluble in common organic solvents and their mixtures, so they can be processed to obtain various kinds of drug delivery formulations.

TABLE 4

The swelling degree of the graft copolymer (A) Dissolution Medium: 0.1N HCl

| Time (hours) | 4-Vinylpyridine content (wt %) | | |
|---|---|---|---|
| | 30 | 41 | 50 |
| 0.5 | 225.32 | 232.50 | 141.64 |
| 1.0 | 197.37 | 178.23 | 88.59 |

TABLE 4-continued

The swelling degree of the graft copolymer

| | | | |
|---|---|---|---|
| 2.0 | 140.17 | 129.47 | 27.58 |
| 3.0 | 134.93 | 120.66 | 21.48 |
| 5.0 | 124.45 | 111.57 | 13.26 |
| 7.0 | 110.04 | 104.68 | 1.06 |
| 9.0 | 101.31 | 93.66 | −6.89 |
| 24.0 | 80.34 | 83.19 | −17.24 |

(B) Dissolution Medium: pH 5.8 phosphate buffer solution

| | 4-Vinylpyridine content (wt %) | | |
|---|---|---|---|
| Day | 30 | 41 | 50 |
| 1 | 2.93 | 3.17 | 2.78 |
| 4 | 3.61 | 2.89 | 4.08 |
| 7 | 2.38 | 3.89 | 2.66 |

Example 5

This example discloses the preparation of

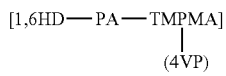

graft copolymer.

This involves, the preparation of (a) unsaturated polyester [1,6 HD-PA-TMPMA] and (b) graft copolymerization on said unsaturated polyester with 4VP.

A. Preparation of Unsaturated Polyester

The unsaturated polyester was prepared by melt polycondensation of 1,6 HD, PA and TMPMA using Titanium (IV) butoxide and hydroquinone. The reaction was carried out in a two neck round-bottom flask equipped with a nitrogen containing bladder and a water cooled condenser. The flask was charged with 2.860 g (0.0141 moles) of TMPMA, 0.120 g (1.089×10⁻⁰³ moles) of hydroquinone and 0.020 g (5.878× 10⁻⁰⁵ moles) of Titanium (IV) butoxide and then stirred for 15 minutes. To this 6.685 g (0.0565 moles) of 1,6 HD and 10.474 g (0.0707 moles) of PA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,6 HD, PA and TMPMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 45:49:6 (1,6 HD:PA:TMPMA) and 8750 g mol⁻¹ respectively.

B. Preparation of Graft Copolymer

The graft copolymer was prepared by solution polymerization. The unsaturated polyester [1,6 HD-PA-TMPMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 5 (A and B). The graft copolymers did not contain free unsaturations and they are stable on storage. The synthesized polymers are soluble in common organic solvents and their mixtures, so they can be processed to obtain various kinds of drug delivery formulations.

TABLE 5

The swelling degree of the graft copolymer (A) Dissolution Medium: 0.1N HCl

| | 4-Vinylpyridine content (wt %) | | |
|---|---|---|---|
| Time (hours) | 27 | 35 | 42 |
| 0.5 | 303.16 | 314.75 | 285.20 |
| 1.0 | 260.12 | 273.77 | 178.92 |
| 2.0 | 306.96 | 251.91 | 168.60 |
| 3.0 | 206.32 | 202.73 | 152.91 |
| 5.0 | 246.20 | 165.57 | 144.84 |
| 7.0 | 190.50 | 137.70 | 131.39 |
| 9.0 | 204.43 | 115.84 | 107.17 |
| 24.0 | −95.78 | −96.86 | −92.09 |

(B) Dissolution Medium: pH 5.8 phosphate buffer solution

| | 4-Vinylpyridine content (wt %) | | |
|---|---|---|---|
| Day | 27 | 35 | 42 |
| 1 | 2.27 | 2.24 | 3.00 |
| 4 | 2.15 | 3.10 | 3.17 |
| 7 | 2.91 | 2.52 | 3.51 |

Example 6

This example discloses the preparation of

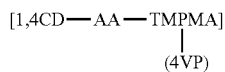

graft copolymer.

This involves, the preparation of (a) unsaturated polyester [1,4 CD-AA-TMPMA] and (b) graft copolymerization on said unsaturated polyester with 4VP.

A. Preparation of Unsaturated Polyester

The unsaturated polyester was prepared by melt polycondensation of 1,4 CD, AA and TMPMA using Titanium (IV) butoxide and hydroquinone. The reaction was carried out in a two neck round-bottom flask equipped with a nitrogen containing bladder and a water cooled condenser. The flask was charged with 2.738 g (0.0135 moles) of TMPMA, 0.150 g (1.362×10⁻⁰³ moles) of hydroquinone and 0.00.25 g (7.348× 10⁻⁰⁵ moles) of Titanium (IV) butoxide and then stirred for 15 minutes. To this 10.250 g (0.0710 moles) of 1,4 CD and 12.028 g (0.0846 moles) of AA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 CD, AA and TMPMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 45:50:5 (1,4 CD:AA:TMPMA) and 8880 g mol$^{-1}$ respectively.

B. Preparation of Graft Copolymer

The graft copolymer was prepared by solution polymerization. The unsaturated polyester [1,4 CD-AA-TMPMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 6 (A and B). The graft copolymers did not contain free unsaturations and they are stable on storage. The synthesized polymers are soluble in common organic solvents and their mixtures, so they can be processed to obtain various kinds of drug delivery formulations.

TABLE 6

The swelling degree of the graft copolymer (A) Dissolution Medium: 0.1N HCl

| Time (hours) | 4-Vinylpyridine content (wt %) | | |
|---|---|---|---|
| | 31 | 38 | 51 |
| 0.5 | 179.38 | 121.64 | 90.38 |
| 1.0 | 119.08 | 78.60 | 52.69 |
| 2.0 | 105.34 | −13.14 | −64.23 |
| 3.0 | 80.91 | −36.34 | −73.84 |
| 5.0 | 46.18 | −70.10 | −91.92 |
| 7.0 | −1.90 | −78.09 | Disintegrated/Dissolved |
| 9.0 | −25.57 | −89.17 | — |
| 24.0 | −84.73 | Disintegrated/Dissolved | — |

(B) Dissolution Medium: pH 5.8 phosphate buffer solution

| Day | 4-Vinylpyridine content (wt %) | | |
|---|---|---|---|
| | 31 | 38 | 51 |
| 1 | 3.09 | 3.08 | 2.63 |
| 4 | 3.74 | 2.77 | 2.95 |
| 7 | 3.98 | 4.41 | 3.45 |

Example 7

This example discloses the preparation of

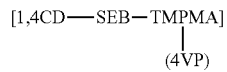

graft copolymer.

This involves, the preparation of (a) unsaturated polyester [1,4 CD-SEB-TMPMA] and (b) graft copolymerization on said unsaturated polyester with 4VP.

A. Preparation of Unsaturated Polyester

The unsaturated polyester was prepared by melt polycondensation of 1,4 CD, SEB and TMPMA using Titanium (IV) butoxide and hydroquinone. The reaction was carried out in a two neck round-bottom flask equipped with a nitrogen containing bladder and a water cooled condenser. The flask was charged with 2.555 g (0.0126 moles) of TMPMA, 0.150 g (1.362×10$^{-03}$ moles) of hydroquinone and 0.025 g (7.348×10$^{-05}$ moles) of Titanium; (IV) butoxide and then stirred for 15 minutes. To this 8.300 g (0.0575 moles) of 1,4 CD and 14.195 g (0.0701 moles) of SEB were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 CD, SEB and TMPMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 45:50:5 (1,4 CD:SEB:TMPMA) and 11361 g mol$^{-1}$ respectively.

B. Preparation of Graft Copolymer

The graft copolymer was prepared by solution polymerization. The unsaturated polyester [1,4 CD-SEB-TMPMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 7 (A and B). The graft copolymers did not contain free unsaturations and they are stable on storage. The synthesized polymers are soluble in common organic solvents and their mixtures, so they can be processed to obtain various kinds of drug delivery formulations.

TABLE 7

The swelling degree of the graft copolymer (A) Dissolution Medium: 0.1N HCl

| Time (hours) | 4-Vinylpyridine content (wt %) | | |
|---|---|---|---|
| | 33 | 39 | 50 |
| 0.5 | 337.61 | 326.92 | 111.74 |
| 1.0 | 210.74 | 164.20 | 84.89 |
| 2.0 | 185.07 | 116.27 | 16.10 |
| 3.0 | 163.58 | 54.14 | −27.85 |
| 5.0 | 122.98 | 12.72 | −57.38 |
| 7.0 | 100.89 | −22.18 | −78.52 |
| 9.0 | 82.68 | −47.04 | Disintegrated/Dissolved |
| 24.0 | 63.28 | −65.68 | — |

TABLE 7-continued

The swelling degree of the graft copolymer (B) Dissolution Medium: pH 5.8 phosphate buffer solution

| | 4-Vinylpyridine content (wt %) | | |
|---|---|---|---|
| Day | 33 | 39 | 50 |
| 1 | 3.25 | 2.53 | 3.74 |
| 4 | 2.60 | 2.01 | 2.34 |
| 7 | 4.25 | 3.64 | 3.04 |

Example 8

This example discloses the preparation

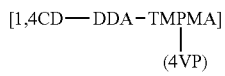

graft copolymer.

This involves, the preparation of (a) unsaturated polyester [1,4 CD-DDA-TMPMA] and (b) graft copolymerization on said unsaturated polyester with 4VP.

A. Preparation of Unsaturated Polyester

The unsaturated polyester was prepared by melt polycondensation of 1,4 CD, DDA and TMPMA using Titanium (IV) butoxide and hydroquinone. The reaction was carried out in a two neck round-bottom flask equipped with a nitrogen containing bladder and a water cooled condenser. The flask was charged with 2.622 g (0.0129 moles) of TMPMA, 0.150 g ($1.362 \times 10^{-03}$ moles) of hydroquinone and 0.025 g ($7.348 \times 10^{-05}$ moles) of Titanium (IV) butoxide and then stirred for 15 minutes. To this 7.480 g (0.0518 moles) of 1,4 CD and 14.923 g (0.0648 moles) of DDA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 CD, DDA and TMPMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 44:50:6 (1,4 CD:DDA:TMPMA) and 11647 g mol$^{-1}$ respectively.

B. Preparation of Graft Copolymer

The graft copolymer was prepared by solution polymerization. The unsaturated polyester [1,4 CD-DDA-TMPMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rotaevaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 8 (A and B). The graft copolymers did not contain free unsaturations and they are stable on storage. The synthesized polymers are soluble in common organic solvents and their mixtures, so they can be processed to obtain various kinds of drug delivery formulations.

TABLE 8

The swelling degree of the graft copolymer (A) Dissolution Medium: 0.1N HCl

| | 4-Vinylpyridine content (wt %) | | |
|---|---|---|---|
| Time (hours) | 30 | 38 | 50 |
| 0.5 | 254.59 | 478.54 | 246.26 |
| 1.0 | 360.91 | 259.86 | 162.68 |
| 2.0 | 341.95 | 237.02 | 124.62 |
| 3.0 | 281.03 | 230.79 | 47.01 |
| 5.0 | 260.91 | 200.00 | 6.71 |
| 7.0 | 236.78 | 167.82 | −20.89 |
| 9.0 | 209.59 | 137.71 | −39.55 |
| 24.0 | 165.80 | 82.69 | −42.53 |

(B) Dissolution Medium: pH 5.8 phosphate buffer solution

| | 4-Vinylpyridine content (wt %) | | |
|---|---|---|---|
| Day | 30 | 38 | 50 |
| 1.0 | 1.86 | 2.23 | 2.60 |
| 4.0 | 2.93 | 3.44 | 1.98 |
| 7.0 | 4.12 | 2.90 | 2.15 |

Example 9

This example discloses the preparation of

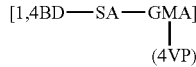

graft copolymer.

This involves, the preparation of (a) unsaturated polyester [1,4 BD-SA-GMA] and (b) graft copolymerization on said unsaturated polyester with 4VP.

A. Preparation of Unsaturated Polyester

The unsaturated polyester was prepared by melt polycondensation of 1,4 BD, SA and GMA using Titanium (IV) butoxide and hydroquinone. The reaction was carried out in a two neck round-bottom flask equipped with a nitrogen containing bladder and a water cooled condenser. The flask was charged with 7.730 g (0.0543 moles) of GMA, 0.500 g ($4.5409 \times 10^{-03}$ moles) of hydroquinone and 0.050 g ($1.4692 \times 10^{-04}$ moles) of Titanium (IV) butoxide and then stirred for 15 minutes. To this 15.520 g (0.1722 moles) of 1,4 BD and 26.759 g (0.2265 moles) of SA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,4 BD, SA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 42:52:6 (1,4 BD:SA:GMA) and 9842 g mol$^{-1}$ respectively.

B. Preparation of Graft Copolymer

The graft copolymer was prepared by solution polymerization. The unsaturated polyester [1,4 BD-SA-GMA], 4-vinylpyridine and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 9 (A and B). The graft copolymers did not contain free unsaturations and they are stable on storage. The synthesized polymers are soluble in common organic solvents and their mixtures, so they can be processed to obtain various kinds of drug delivery formulations.

TABLE 9

The swelling degree of the graft copolymer (A) Dissolution Medium: 0.1N HCl

| | 4-Vinylpyridine content (wt %) | | |
|---|---|---|---|
| Time (hours) | 23 | 35 | 49 |
| 0.5 | 286.12 | 251.69 | 37.37 |
| 1.0 | 101.25 | −26.53 | −18.93 |
| 2.0 | 28.76 | −51.26 | −49.35 |
| 3.0 | −5.35 | −76.27 | −76.97 |
| 5.0 | −31.19 | −91.32 | Disintegrated/Dissolved |
| 7.0 | −42.56 | −97.87 | — |
| 9.0 | −56.65 | Disintegrated/Dissolved | — |
| 24.0 | −78.29 | — | — |

(B) Dissolution Medium: pH 5.8 phosphate buffer solution

| | 4-Vinylpyridine content (wt %) | | |
|---|---|---|---|
| Days | 23 | 35 | 49 |
| 1.0 | 2.86 | 2.71 | 3.11 |
| 4.0 | 3.52 | 2.93 | 3.61 |
| 7.0 | 3.49 | 3.21 | 3.79 |

Example 10

This example discloses the preparation of

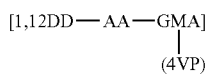

graft copolymer.

This involves, the preparation of (a) unsaturated polyester [1,12 DD-AA-GMA] and (b) graft copolymerization on said unsaturated polyester with 4VP.

A. Preparation of Unsaturated Polyester

The unsaturated polyester was prepared by melt polycondensation of 1,12 DD, AA and GMA using Titanium (IV) butoxide and hydroquinone. The reaction was carried out in a two neck round-bottom flask equipped with a nitrogen containing bladder and a water cooled condenser. The flask was charged with 0.647 g (4.554×10$^{-03}$ moles) of GMA, 0.030 g (2.7245×10$^{-04}$ moles) of hydroquinone and 0.005 g (1.4692× 10$^{-05}$ moles) of Titanium (IV) butoxide and then stirred for 15 minutes. To this 2.150 g (0.0106 moles) of 1,12 DD and 2.218 g (0.0151 moles) of AA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of 1,12 DD, AA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 43:50:7 (1,12 DD:AA:GMA) and 19410 g mol$^{-1}$ respectively.

B. Preparation of Graft Copolymer

The graft copolymer was prepared by solution polymerization. The unsaturated polyester [1,12 DD-AA-GMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized in Table 10 (A and B). The graft copolymers did not contain free unsaturations and they are stable on storage. The synthesized polymers are soluble in common organic solvents and their mixtures, so they can be processed to obtain various kinds of drug delivery formulations.

TABLE 10

The swelling degree of the graft copolymer (A) Dissolution Medium: 0.1N HCl

| | 4-Vinylpyridine content (wt %) | | |
|---|---|---|---|
| Time (hours) | 27 | 36 | 45 |
| 0.5 | 269.12 | 287.39 | 251.86 |
| 1.0 | 226.39 | 216.34 | 172.56 |
| 2.0 | 166.78 | 148.36 | 83.64 |
| 3.0 | 148.35 | 126.39 | 46.82 |
| 5.0 | 139.38 | 118.76 | 29.64 |
| 7.0 | 125.17 | 106.13 | 17.51 |
| 9.0 | 119.37 | 87.49 | 10.64 |
| 24.0 | 96.73 | 52.94 | −12.17 |

(B) Dissolution Medium: pH 5.8 phosphate buffer solution

| | 4-Vinylpyridine content (wt %) | | |
|---|---|---|---|
| Day | 27 | 36 | 45 |
| 1 | 2.39 | 2.86 | 3.21 |
| 4 | 2.82 | 3.12 | 3.56 |
| 7 | 3.18 | 3.67 | 3.84 |

Example 11

This example discloses the preparation of

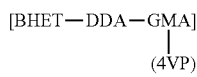

graft copolymer.

This involves, the preparation of (a) unsaturated polyester [BHET-DDA-GMA] and (b) graft copolymerization on said unsaturated polyester with 4VP.

A. Preparation of Unsaturated Polyester

The unsaturated polyester was prepared by melt polycondensation of BHET, DDA and GMA using Titanium (IV) butoxide and hydroquinone. The reaction was carried out in a two neck round-bottom flask equipped with a nitrogen containing bladder and a water cooled condenser. The flask was charged with 3.731 g (0.0262 moles) of GMA, 0.500 g ($4.5409 \times 10^{-03}$ moles) of hydroquinone and 0.050 g ($1.4692 \times 10^{-04}$ moles) of Titanium (IV) butoxide and then stirred for 15 minutes. To this 21.135 g (0.0831 moles) of BHET and 25.190 g (0.1093 moles) of DDA were added and the temperature was raised to 170° C. over 45 minutes. After 6 hours of reaction, 170 mm Hg of vacuum was applied and the reaction was continued for further 4 hours. The polyester obtained was dissolved in chloroform and precipitated in cold methanol. The precipitate was filtered and washed with methanol two times and then air dried for 24 hours. The molar composition of BHET, DDA and GMA in unsaturated polyester was determined by peak integral value of $^1$H NMR spectrum. The weight average molecular weight of unsaturated polyester was determined by Gel Permeation Chromatography using Styragel column and tetrahydrofuran as eluting solvent at the rate of 1 ml/min. Polystyrene was used as standard. The molar composition of the unsaturated polyester and its weight average molecular weight were 41:52:7 (BHET:DDA:GMA) and 11784 g mol$^{-1}$ respectively.

B. Preparation of Graft Copolymer

The graft copolymer was prepared by solution polymerization. The unsaturated polyester [BHET-DDA-GMA], 4VP and 1% wt/wt. of free radical initiator azobisisobutyronitrile were dissolved in dimethylformamide. After purging with nitrogen, polymerization was carried out at 65° C. for 20 hours. The polymer solution was concentrated by using rota-evaporator. The polymer was precipitated into cold methanol/water mixture (1:1 v/v) and dried at room temperature under vacuum. The said graft copolymer was prepared as to incorporate three different levels of 4VP by varying the weight ratio of the unsaturated polyester to 4VP in the feed. The 4VP content of the graft copolymers and their swelling degree in 0.1 N HCl and in pH 5.8 phosphate buffer solutions are summarized, in Table 11 (A and B). The graft copolymers did not contain free unsaturations and they are stable on storage. The synthesized polymers are soluble in common organic solvents and their mixtures, so they can be processed to obtain various kinds of drug delivery formulations.

TABLE 11

The swelling degree of the graft copolymer (A) Dissolution Medium: 0.1N HCl

| Time (hours) | 4-Vinylpyridine content (wt %) | | |
|---|---|---|---|
| | 24 | 33 | 41 |
| 0.5 | 196.65 | 271.36 | 311.82 |
| 1.0 | 268.49 | 366.13 | 332.92 |
| 2.0 | 327.95 | 391.48 | 287.54 |
| 3.0 | 361.46 | 388.16 | 215.84 |
| 5.0 | 345.19 | 356.17 | 151.36 |
| 7.0 | 301.63 | 298.64 | 116.34 |
| 9.0 | 268.36 | 236.16 | 68.36 |
| 24.0 | 197.64 | 149.64 | 14.36 |

(B) Dissolution Medium: pH 5.8 phosphate buffer solution

| Days | 4-Vinylpyridine content (wt %) | | |
|---|---|---|---|
| | 24 | 33 | 41 |
| 1.0 | 1.38 | 1.21 | 1.11 |
| 4.0 | 1.91 | 1.86 | 1.54 |
| 7.0 | 2.16 | 1.74 | 1.96 |

ADVANTAGES OF THE INVENTION

The graft copolymer of the invention exhibits pH dependant behavior

The solvent soluble pH sensitive copolymers of the invention swell and or dissolve at acidic pH.

The solvent soluble pH sensitive copolymers of the invention do not swell and or dissolve at near and above neutral pH.

pH dependent graft copolymer is useful as protective coating material for pharmaceutical dosage form and as an excipient in the development of extended release formulations.

We claim:

1. A graft copolymer which exhibits pH dependent behavior, having a formula 1

Formula 1 comprises:
a. a backbone having the formula [A(x)B(y)C(z)] comprising:
a diol (A) selected from the group consisting of 1,2-ethane diol, 1,3-propane diol, 1,2-propane diol, 2-methyl-1,3-propane diol, 1,4-butane diol, 1,3-butane diol, 1,2-butane diol, 1,5-pentane diol, 1,6-hexane diol, 1,7-heptane diol, 1,8-octane diol, 1,9-nonane diol, 1,12-dodecane diol, 1,4-cyclohexanedimethanol and bis(2-hydroxyethyl)terephthalate,
a dicarboxylic acid (B) selected from the group consisting of succinic acid, glutaric acid, adipic acid, pimelic acid, suberic acid, azelaic acid, sebacic acid and dodecanedioic acid or acid anhydride (B) selected from the group consisting of succinic anhydride and phthalic anhydride and
an epoxy monomer (C) containing pendant unsaturation selected from the group consisting of glycidyl methacrylate and glycidyl acrylate or a diol monomer (C) containing pendant unsaturation selected from the group consisting of trimethylolpropane monomethacrylate and trimethylolpropane monoacrylate,
wherein (x)=41-45%, (y)=49-53% (z)=4-7% by mole; and
b. a graft which is a polymer of a vinyl pyridine monomer (D) and 'w' is a weight percent of the total weight of said graft copolymer such that 'w' is 22-52%.

2. The graft copolymer as claimed in claim 1, wherein the backbone is polyester.

3. The graft copolymer as claimed in claim 1, wherein the vinyl pyridine monomer is selected from the group consisting of 2-vinyl pyridine, 3-vinyl pyridine and 4-vinyl pyridine.

4. A process for preparation of the graft copolymer as claimed in claim 1, comprising the steps of:
   i. stirring monomer (C), titanium (IV) butoxide and hydroquinone in two neck round bottom flask for 10 to 15 minute;
   ii. adding diol (A), dicarboxylic acid or acid anhydride (B) and raising the temperature to 160° C. to 170° C. over 45 minutes and maintaining for 5-7 hours followed by applying vacuum of 170 mm of Hg for 3-5 hours to obtain unsaturated polyester;
   iii. dissolving unsaturated polyester as obtained in step (ii) in chloroform and precipitating in cold methanol;
   iv. filtering, washing with methanol and drying for 20-25 hours to obtain said unsaturated polyester in dried form;
   v. dissolving the dried unsaturated polyester as obtained in step (iv), basic 3.-nonomer and azobis isobutyronitrile in dimethyl formamide followed by purging with nitrogen and grafting the monomer on the unsaturated polyester at 60-70° C. for 18-22 hours;
   vi. concentrating, precipitating and drying to obtain graft copolymer.

5. The graft copolymer as claimed in claim 1, wherein the graft copolymer exhibiting pH dependent behavior is soluble in organic solvents selected from the group consisting of dimethylformamide, dimethylacetamide, tetrahydrofuran, chlorofor and 1,2-dichloromethane.

6. The graft copolymer as claimed in claim 1, wherein the graft copolymer exhibiting pH dependent behavior swells or dissolves at pH≤3.0.

7. The graft copolymer as claimed in claim 1, wherein the vinyl pyridine monomer is 4-vinyl pyridine.

* * * * *